Nov. 13, 1934.   R. W. JANDA   1,980,757
CLUTCH
Original Filed Sept. 26, 1930   2 Sheets-Sheet 2
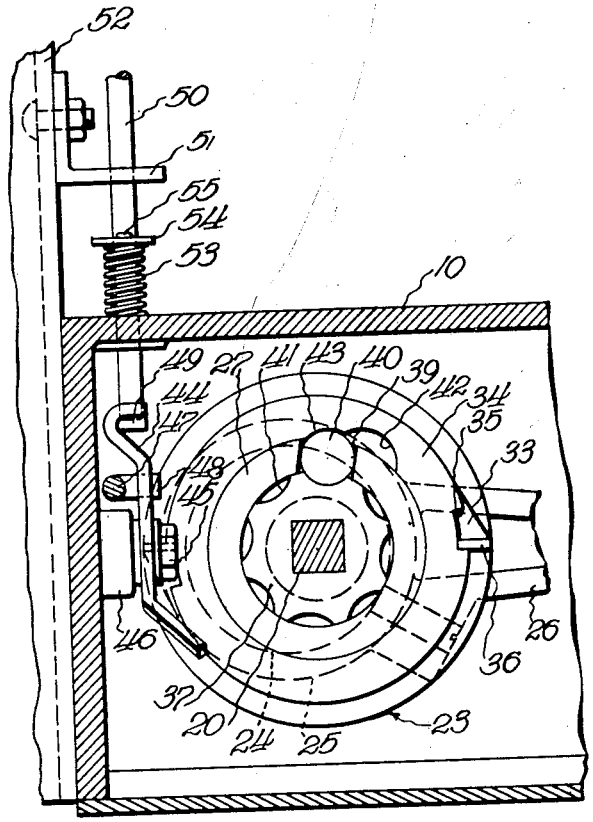
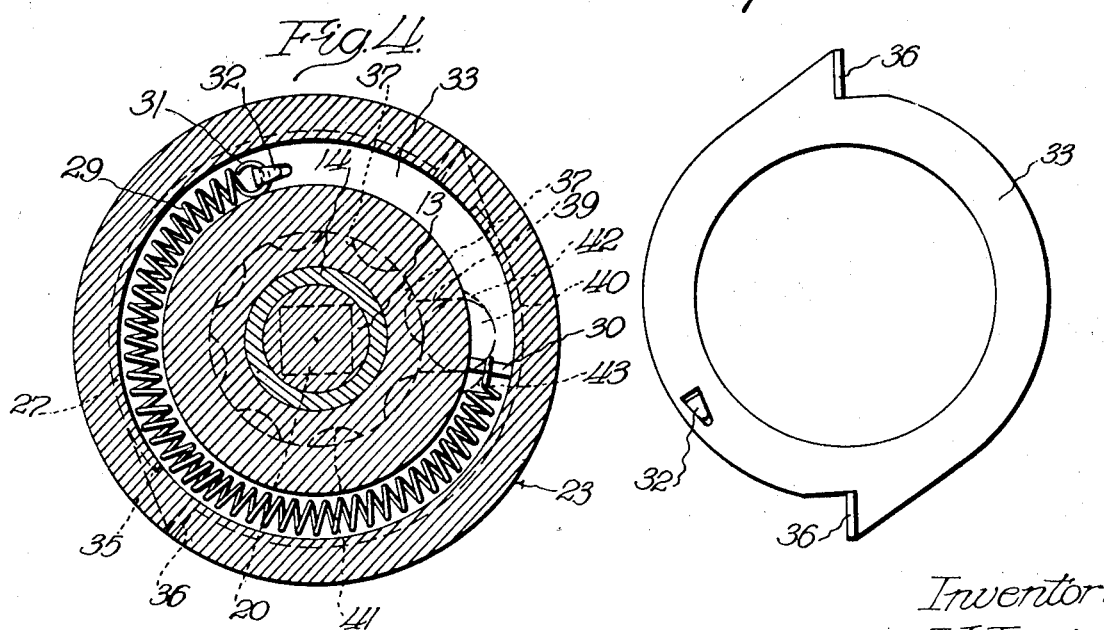
Inventor:
Rudolph W. Janda
By Brown, Jackson, Boettcher & Dienner,
Attys.

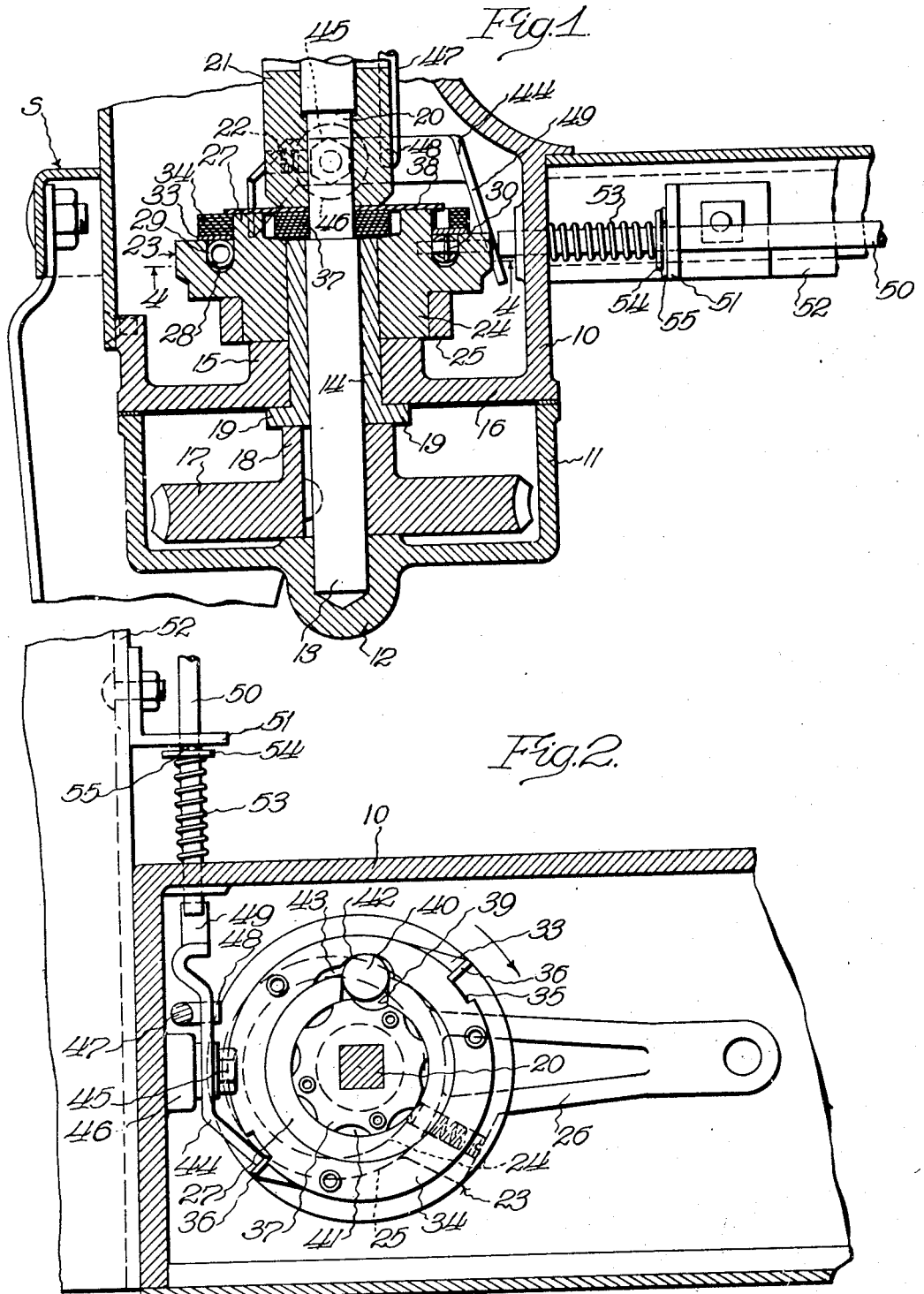

Patented Nov. 13, 1934

1,980,757

UNITED STATES PATENT OFFICE 1,980,757

CLUTCH

Rudolph W. Janda, Berwyn, Ill., assignor to Conlon Corporation, Cicero, Ill., a corporation of Illinois Original application September 26, 1930, Serial No. 484,542. Divided and this application September 21, 1931, Serial No. 563,944

7 Claims. (Cl. 192—27)

This invention relates to clutches.

This application is a division of my copending application for Ironing machine, Serial No. 484,542, filed September 26, 1930.

While the above identified application discloses the clutch as applied to ironing machines, for which it is particularly adapted, I desire it to be understood that I do not intend to limit it to such use, as the invention, in its broader aspects, is capable of being used with other types of machines.

The primary aim of the present invention is the provision of simplified clutch mechanism, in which I have incorporated certain improvements and novel features.

More specifically, the invention contemplates the provision of clutch mechanism for coupling an eccentric member to a driven shaft, and the provision of means for operating the clutch mechanism whenever engagement or disengagement of the clutch with the shaft is desired.

The invention also contemplates the provision of clutch mechanism, the parts of which may be easily fabricated, easily assembled in cooperation with other parts and so constructed that the clutch will render reliable service.

Other objects and advantages of the invention will appear from the following detailed description when taken in connection with the accompanying drawings, in which:

Figure 1 is a vertical sectional view of the clutch mechanism of the present invention;

Figure 2 is a top plan view of the clutch mechanism and the operating means therefor;

Figure 3 is a view similar to Figure 2 but showing the relative positions of the parts when the clutch trip finger is raised and the eccentric is clutched to the shaft;

Figure 4 is a section taken substantially on line 4—4 of Figure 1; and

Figure 5 is a plan view of the clutch operating ring.

Referring now to the drawings, the numeral 10 indicates a housing for enclosing the clutch mechanism proper. This housing is mounted upon a supporting structure S, such as the frame and bed of an ironing machine, in a suitable manner.

A worm gear housing 11 is detachably secured in any suitable or preferred manner to the underface of housing 10. This housing 11 is provided with a depending boss 12 which is suitably bored from its upper end for reception of a shaft 13 rotatably mounted therein. This shaft extends upwardly through a bearing bushing 14 which fits through a collar 15 integral with and extending upwardly from bottom wall 16 of housing 10, this collar being concentric with the bore of boss 12. A worm gear 17 is keyed or otherwise suitably secured upon shaft 13 and is rotatably seated upon the upper end of boss 12. Suitable driving means (not shown) is adapted to cooperate with the gear 17 for imparting rotation to shaft 13, the rotation of shaft 13 being in a clockwise direction as considered in Fig. 2.

Hub 18 of worm gear 17 contacts a flange 19 at the lower end of the bushing 14 and acts to hold this bushing against downward movement. The upper end portion of shaft 13 is of reduced and squared cross section, at 20, and fits into a correspondingly shaped bore in a member 21 secured upon portion 20 of shaft 13 in a suitable manner, as by means of a set screw 22.

An eccentric structure 23 is mounted for free turning movement about the bearing bushing 14. This structure is provided, at its underside, with a reduced eccentric element 24 which seats upon the upper face of collar 15. An eccentric strap 25 fits about eccentric element 24. This strap is formed at one end of an arm 26 which is secured, at its other end, to any suitable means which is to be operated by said clutch. The strap 25 and arm 26 are fully disclosed in the above mentioned copending application and inasmuch as they form no part of the present invention, need not be further described here.

Eccentric member 23 is provided with an upwardly projecting flange 27 concentric with shaft 13, the upper face of this member being flat or plane from the flange to the outer edge of the body portion thereof. Member 23 is provided, in the upper face thereof and adjacent flange 27, with a channel 28 of appreciable depth, which receives a tension coil spring 29. One end of this spring is secured, by a pin 30, to member 23. At its other end, spring 29 is provided with an eye 31 which receives a tongue 32 pressed downwardly from a clutch operating ring 33 which fits about flange 27 and seats upon the upper face of eccentric member 23, this ring forming a closure for the upper end of channel 28. An annular clutch yoke 34 is disposed about flange 27 and seats upon the ring 33. This yoke is provided with diametrically disposed notches 35 which receive angularly disposed tabs 36 formed integrally with the ring 33 and projecting upwardly therefrom, these tabs being outwardly offset relative to the body portion of the ring. A star wheel 37 is disposed within the pocket or recess defined by flange 27 and fits about the squared portion 20 of shaft 13 for rotation therewith. This star wheel and the yoke 34 are preferably of laminated construction, the elements thereof being suitably secured together, as by riveting. The star wheel and the yoke are thus built up from elements which can be stamped out of sheet metal of suitable gauge, which is advantageous as contributing to low cost of production. However, the yoke and the star wheel may be otherwise constructed if desired. An annular cover plate 38 is disposed beneath member 21 and seats upon shoulder or flange 27, this plate projecting outwardly beyond this flange and acting to hold the yoke 34 and the star wheel 37 and cooperating parts against upward movement.

Referring more particularly to Figures 2, 3 and 4, flange 27 is provided with a slot 39 extending therethrough and of a size to accommodate a clutch disc 40 of a size and shape to fit into the notches 41 of the star wheel 37. Clutch yoke 34 is provided, in its inner edge, with a recess 42 of proper depth to receive the portion of disc 40 which projects beyond flange 27 when this disc is in its outer or inoperative position. This recess is provided with an extension 43 of reduced depth to accommodate the outer portion of the disc 40 when the latter is in its inner or operative position. The spring 29 urges ring 33 in a clockwise direction, as considered in Figure 2.

A trip finger 44 is rockably mounted, as by means of a cap screw 45, upon a boss 46 projecting inwardly from the wall of gear housing 10. A control rod 47 is mounted in any suitable or preferred manner in the housing 10 and is pivotally connected at its lower end, at 48, to finger 44. Finger 44 is provided, at the inner end thereof, with an element 49 disposed for contact by one end of a supplemental control rod 50 slidable through a bracket 51 suitably secured to an angle strip 52. An expansion coil spring 53 is mounted about rod 50 and is confined between the inner wall of housing 10 and a washer 54 mounted about rod 50 and held against relative movement toward bracket 51 by a cotter pin 55.

By operating either of the rods 47 or 50 for raising the trip finger 44, the eccentric member 23 may be alternately clutched to or declutched from the shaft 13. That is, movement of the rod 50 inwardly of the housing 10 serves to rock finger 44 so as to raise the other end thereof into inoperative position. The same result is accomplished by depressing the rod 47. The spring 53 serves normally to hold rod 50 in its outer or inoperative position, and the finger 44 is normally held in its operative position. In such position, the rearward or inner end of the finger is disposed to contact tabs 36 of the ring 33. This serves to hold yoke 34 in such position that recess 42 thereof is in alignment with slot 39, due to contact of tabs 36 with the end walls of notches 35. At this time the disc 40 is in its outer or inoperative position (Fig. 2), and the star wheel 37 is free to turn with shaft 13 independently of the eccentric member 23 and other parts associated therewith.

In Figure 2, it will be noted that the eccentric member is disposed in its extreme position to the left of shaft 13 and that the finger 44 is in its operative position. When the finger 44 is raised into inoperative position, through the medium of rod 47 or rod 50, as the case may be, thus releasing the ring 33, spring 29 immediately turns the ring in a clockwise direction so as to bring the tabs 36 into contact with the ends of the notches 35 opposite to the ends thereof with which these tabs contact in Figure 2, the spring then acting to turn both the ring 33 and the clutch yoke 34 in a clockwise direction. This movement of yoke 34 moves the disc 40 inwardly into engagement with star wheel 37 and, the shaft 13 being driven, clutches the eccentric member to the star wheel for rotation therewith, as in Fig. 3. This movement of the yoke 34 serves first to move the disc 40 inwardly, after which the reduced portion 43 of recess 42 is brought into position to fit about the outer portion of disc 40 thus holding it in its inner or operative position. The eccentric member turns with the star wheel through a half rotation, at which time the other tab 36 of ring 33 contacts trip finger 44, it being understood that this trip finger is returned to its operative position immediately upon release of rod 47 or 50, as the case may be. Upon contact of the tab 36 with the trip finger, ring 33 is held against turning movement, yoke 34 continuing to turn with the star wheel until the end walls of notches 35 contact the tabs, at which time the yoke also is held against turning movement. Upon continued turning of the star wheel and the eccentric member, slot 39 is again brought into alignment with recess 42, at which time disc 40 is forced outwardly into this recess, by the pressure exerted upon this disc by the star wheel. This returns the parts to their relative positions of Figure 2, except that the disc 40 and associated parts will have been moved through an arc of 180° from the position of this figure, and the eccentric element will have been turned through an arc of 180° so as to be disposed to the right of shaft 13, as considered in Figure 2.

I desire it to be understood that although I have described in detail the preferred embodiment of my invention, it is not to be limited to the particular construction shown except insofar as it may be limited by the appended claims.

What I claim is:

1. In combination, an outer clutch member having an annular flange defining a recess and provided with a slot therethrough, an inner clutch member in said recess and free from the outer member, a coupling member operating in the slot and movable into and out of engagement with the inner clutch member, a yoke member fitting about the flange and movable thereabout, said yoke member having a recess adapted for reception of the outer portion of the coupling member when said recess is aligned with the slot, yielding means urging the yoke in a direction to move said recess of the yoke member out of alignment with the slot and thereby move the coupling member inwardly into engagement with the inner clutch member, and releasable means for normally holding the yoke member in inoperative position.

2. In combination, an outer clutch member having an upwardly extending annular flange defining a recess, said member being provided with a channel in its upper face and extending about the flange, an inner clutch member mounted in the recess, an operating ring mounted on the upper face of the outer member to turn about the flange, a yoke member mounted upon the ring and about the flange, said yoke being free from the flange, said flange being provided with a slot, a coupling member operating in the slot and movable into and out of engagement with the inner clutch member, the yoke having a recess adapted when aligned with the slot to receive the outer portion of the coupling member, and a tension spring in the channel anchored at one end to the outer clutch member and having its other end anchored to the ring, the ring and the yoke member having cooperating abutment elements for turning the latter with the former and the spring acting to turn the yoke member so as to dispose the recess thereof out of alignment with the slot and thereby force the coupling member into engagement with said inner clutch member.

3. In combination, an outer clutch member having an upwardly extending annular flange defining a recess, said member being provided with a channel in its upper face and extending about the flange, an inner clutch member mounted in the recess, an operating ring mounted on the upper face of the outer member to turn about the flange, a yoke member mounted upon the ring and about the flange, said yoke being free from the flange, said flange being provided with a slot, a coupling member operating in the slot and movable into and out of engagement with the inner clutch member, the yoke having a recess adapted when aligned with the slot to receive the outer portion of the coupling member, and a tension spring in the channel anchored at one end to the outer clutch member and having its other end anchored to the ring, the ring and the yoke member having cooperating abutment elements for turning the latter with the former and the spring acting to turn the yoke member so as to dispose the recess thereof out of alignment with the slot and thereby force the coupling member into engagement with said inner clutch member, and releasable means cooperating with the abutment elements of the ring for normally holding the ring and the yoke member in inoperative position with the recess of the yoke member aligned with the slot of the flange.

4. In combination, an outer clutch member having an upwardly extending annular flange defining a recess, said member being provided with a channel in its upper face and extending about the flange, an inner clutch member mounted in the recess, an operating ring mounted on the upper face of the outer member to turn about the flange, a yoke member mounted upon the ring and about the flange, said yoke being free from the flange, said flange being provided with a slot, a coupling member operating in the slot and movable into and out of engagement with the inner clutch member, the yoke having a recess adapted when aligned with the slot to receive the outer portion of the coupling member, and a tension spring in the channel anchored at one end to the outer clutch member and having its other end anchored to the ring, the ring being provided with upwardly projecting abutment elements and the yoke member being provided with notches receiving said elements of the ring.

5. In combination, an outer clutch member having an upwardly extending flange defining a recess, a star wheel mounted in said recess for free turning movement, a yoke member mounted about the flange for relative turning movement, the flange having a slot therethrough, a disc slidable in the slot and adapted to fit between the teeth of the star wheel when in its inner position, the yoke member having a recess adapted for reception of the outer portion of the disc when said recess is aligned with the slot, and yielding means for turning the yoke about the flange so as to dispose the recess of the yoke out of alignment with the slot and thereby move the disc inwardly into engagement with the star wheel.

6. In combination, an outer clutch member having an annular flange defining a recess and provided with an opening therethrough, an inner clutch member in said recess and free from the outer member, a coupling member operating in the opening and movable into and out of engagement with the inner clutch member, a yoke member fitting about the flange and movable thereabout, said yoke member having a recess adapted for reception of the outer portion of the coupling member when said recess is aligned with the opening, yielding means urging the yoke in a direction to move said recess of the yoke member out of alignment with the opening and thereby move the coupling member inwardly into engagement with the inner clutch member, and releasable means for normally holding the yoke member in inoperative position.

7. In a machine of the character described, a positive clutch comprising an inner clutch member provided with a plurality of cavities therein, a second clutch member surrounding the said inner clutch member and in continuous contact therewith, the said second clutch member being provided with an opening extending radially therethrough, a member within the said opening adapted to engage within the cavities of the said inner member, and an outer member surrounding the said second member and in continuous contact therewith, the said outer member being rotatably movable with respect to the second member to selectively force the said clutch engaging member into engagement with the said cavities when the said outer member is moved in one direction to thereby interlock the said inner and second members in operative engagement and to release the said clutch engaging member upon movement in the other direction to release the said clutch members from their operative engagement.

RUDOLPH W. JANDA.